United States Patent
Ebenezer

(10) Patent No.: US 10,395,667 B2
(45) Date of Patent: Aug. 27, 2019

(54) CORRELATION-BASED NEAR-FIELD DETECTOR

(71) Applicant: Cirrus Logic International Semiconductor Ltd., Edinburgh (GB)

(72) Inventor: Samuel P. Ebenezer, Tempe, AZ (US)

(73) Assignee: Cirrus Logic, Inc., Austin, TX (US)

(*) Notice: Subject to any disclaimer, the term of this patent is extended or adjusted under 35 U.S.C. 154(b) by 88 days.

(21) Appl. No.: 15/594,347

(22) Filed: May 12, 2017

(65) Prior Publication Data
US 2018/0330747 A1 Nov. 15, 2018

(51) Int. Cl.

| | |
|---|---|
| G10L 15/00 | (2013.01) |
| G10L 15/20 | (2006.01) |
| G10L 25/06 | (2013.01) |
| G01S 3/80 | (2006.01) |
| G10L 25/84 | (2013.01) |
| G10L 21/0216 | (2013.01) |
| G10L 21/0264 | (2013.01) |

(Continued)

(52) U.S. Cl.
CPC .............. *G10L 25/06* (2013.01); *G01S 3/805* (2013.01); *G01S 3/8006* (2013.01); *G10L 15/20* (2013.01); *G10L 21/0216* (2013.01); *G10L 21/0264* (2013.01); *G10L 25/84* (2013.01); *H04R 3/005* (2013.01); *G10L 2021/02166* (2013.01); *H04R 2430/20* (2013.01)

(58) Field of Classification Search
None
See application file for complete search history.

(56) References Cited

U.S. PATENT DOCUMENTS

| 7,492,889 B2 | 2/2009 | Ebenezer |
| 8,565,446 B1 | 10/2013 | Ebenezer |

(Continued)

FOREIGN PATENT DOCUMENTS

JP 2005236852 A 9/2005

OTHER PUBLICATIONS

Combined Search and Examination Report, UKIPO, Application No. GB1709761.9, dated Dec. 13, 2017.

(Continued)

*Primary Examiner* — Satwant K Singh
(74) *Attorney, Agent, or Firm* — Jackson Walker L.L.P.

(57) ABSTRACT

In accordance with embodiments of the present disclosure, a method for detecting near-field sources in an audio device may include computing a normalized cross correlation function between a first microphone signal and a second microphone signal, computing normalized auto correlation functions of each of the first microphone signal and the second microphone signal, partitioning the normalized cross correlation function and the normalized auto correlation functions into a plurality of time lag regions, computing for each respective time lag region of the plurality of the time lag regions a respective maximum deviation between the normalized cross correlation function and a normalized auto correlation function within the respective time lag region, combining the respective maximum deviations from the plurality of time lag regions to derive multiple detection statistics, and comparing each detection statistic of the multiple detection statistics to a respective threshold to detect a near-field signal.

22 Claims, 17 Drawing Sheets

(51) Int. Cl.
*H04R 3/00* (2006.01)
*G01S 3/805* (2006.01)

(56) References Cited

U.S. PATENT DOCUMENTS

| | | | |
|---|---|---|---|
| 8,798,993 B2* | 8/2014 | Kechichian | G10L 25/78 |
| | | | 704/233 |
| 9,264,804 B2* | 2/2016 | Åhgren | H04R 3/00 |
| 9,472,180 B2* | 10/2016 | Olsson | G10K 11/175 |
| 9,607,603 B1* | 3/2017 | Ebenezer | H04R 1/1083 |
| 9,838,783 B2* | 12/2017 | Ebenezer | G10L 19/025 |
| 10,015,589 B1* | 7/2018 | Ebenezer | H04R 3/005 |
| 10,079,026 B1* | 9/2018 | Ebenezer | G10L 21/0208 |
| 2004/0161120 A1 | 8/2004 | Petersen et al. | |
| 2009/0089053 A1 | 4/2009 | Wang et al. | |
| 2015/0071461 A1* | 3/2015 | Thyssen | G10L 21/0208 |
| | | | 381/94.1 |
| 2015/0172807 A1* | 6/2015 | Olsson | G10K 11/175 |
| | | | 381/74 |
| 2018/0330745 A1* | 11/2018 | Ebenezer | H04R 1/406 |

OTHER PUBLICATIONS

Ramirez, J. et al., A New Voice Activity Detector Using Subband Order-Statistics Filters for Robuse Speech Recognition, IEEE, 2004.
Maj, Jean Baptiste et al., A Real Time Implementation and an Evaluation of an Optimal Filtering Technique for Noise Reduction in Dual Microphone Hearing Aids, IEEE, 2004.
International Search Report and Written Opinion of the International Searching Authority, International Application No. PCT/US2018/031775, dated Aug. 10, 2018.
Spiesberger, John L., "Linking auto- and cross-correlation functions with correlation equations: Application to estimating the relative travel times and amplitudes of multipath", The Journal of the Acoustical Society of America, American Institute of Physics for the Acoustical Society of America, New York, NY, vol. 104, No. 1, Jul. 1, 1998, pp. 300-312.
Chen, Jingdon et al., "Time Delay Estimation in Room Acoustic Environments: An Overview", EURASIP Journal on Advances in Signal Processing, vol. 11, No. 6, Jan. 1, 2006, pp. 1-19.

* cited by examiner

CORRELATION-BASED NEAR-FIELD DETECTOR

TECHNICAL FIELD

The field of representative embodiments of this disclosure relates to methods, apparatuses, and implementations concerning or relating to voice applications in an audio device. Applications include detection of near-field events in a voice activity detector.

BACKGROUND

Voice activity detection (VAD), also known as speech activity detection or speech detection, is a technique used in speech processing in which the presence or absence of human speech is detected. VAD may be used in a variety of applications, including noise suppressors, background noise estimators, adaptive beamformers, dynamic beam steering, always-on voice detection, and conversation-based playback management. Near-field speech detection is a critical element in many voice-based signal processing algorithms that are used in wearable devices. Due to space restrictions, the microphone spacing in wearable devices is typically small, and conventional near-field detection algorithms may not work well for such microphone arrays. Moreover, due to low power constraints in wearable applications, the use of computationally expensive algorithms such as neural network-based classification methods is prohibitive.

In many speech enhancement or noise reduction algorithms, it is often necessary to detect desired speech signals in the presence of interfering signals in order to achieve the required performance. The interfering signals can range from stationary brown or road noises to dynamic signals such as babble/competing talker noise present in pub or restaurant environments. Conventional voice activity detectors are not capable of distinguishing desired speech signals from speech-like interfering signals. Voice-based signal processing algorithms in conventional approaches typically rely on spatial statistics derived using microphone arrays to detect desired speech signals in the presence of various interfering noise types. Such traditional spatial processing-based detectors have been successfully used in handset and headset devices with large microphone spacing (35-150 mm). However, the performance of these detectors tends to degrade when the microphone spacing is reduced. Due to space limitations, in newer devices, microphones may be closely arranged in wearable devices and the spatial diversity information provided by a closely-spaced microphone array may degrade as the spacing is reduced.

SUMMARY

In accordance with the teachings of the present disclosure, one or more disadvantages and problems associated with existing approaches to near-field detection may be reduced or eliminated.

In accordance with embodiments of the present disclosure, a method for detecting near-field sources in an audio device may include computing a normalized cross correlation function between a first microphone signal and a second microphone signal, computing normalized auto correlation functions of each of the first microphone signal and the second microphone signal, partitioning the normalized cross correlation function and the normalized auto correlation functions into a plurality of time lag regions, computing for each respective time lag region of the plurality of the time lag regions a respective maximum deviation between the normalized cross correlation function and a normalized auto correlation function within the respective time lag region, combining the respective maximum deviations from the plurality of time lag regions to derive multiple detection statistics, and comparing each detection statistic of the multiple detection statistics to a respective threshold to detect a near-field signal.

In accordance with these and other embodiments of the present disclosure, an integrated circuit for implementing at least a portion of an audio device may include an audio output configured to reproduce audio information by generating an audio output signal for communication to at least one transducer of the audio device, a first microphone input configured to receive a first microphone signal, a second microphone input configured to receive a second microphone signal, and a processor configured to implement a near-field detector configured to: compute a normalized cross correlation function between a first microphone signal and a second microphone signal, compute normalized auto correlation functions of each of the first microphone signal and the second microphone signal, partition the normalized cross correlation function and the normalized auto correlation functions into a plurality of time lag regions, compute for each respective time lag region of the plurality of the time lag regions a respective maximum deviation between the normalized cross correlation function and a normalized auto correlation function within the respective time lag region, combine the respective maximum deviations from the plurality of time lag regions to derive multiple detection statistics, and compare each detection statistic of the multiple detection statistics to a respective threshold to detect a near-field signal.

Technical advantages of the present disclosure may be readily apparent to one of ordinary skill in the art from the figures, description, and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

Figure 1:
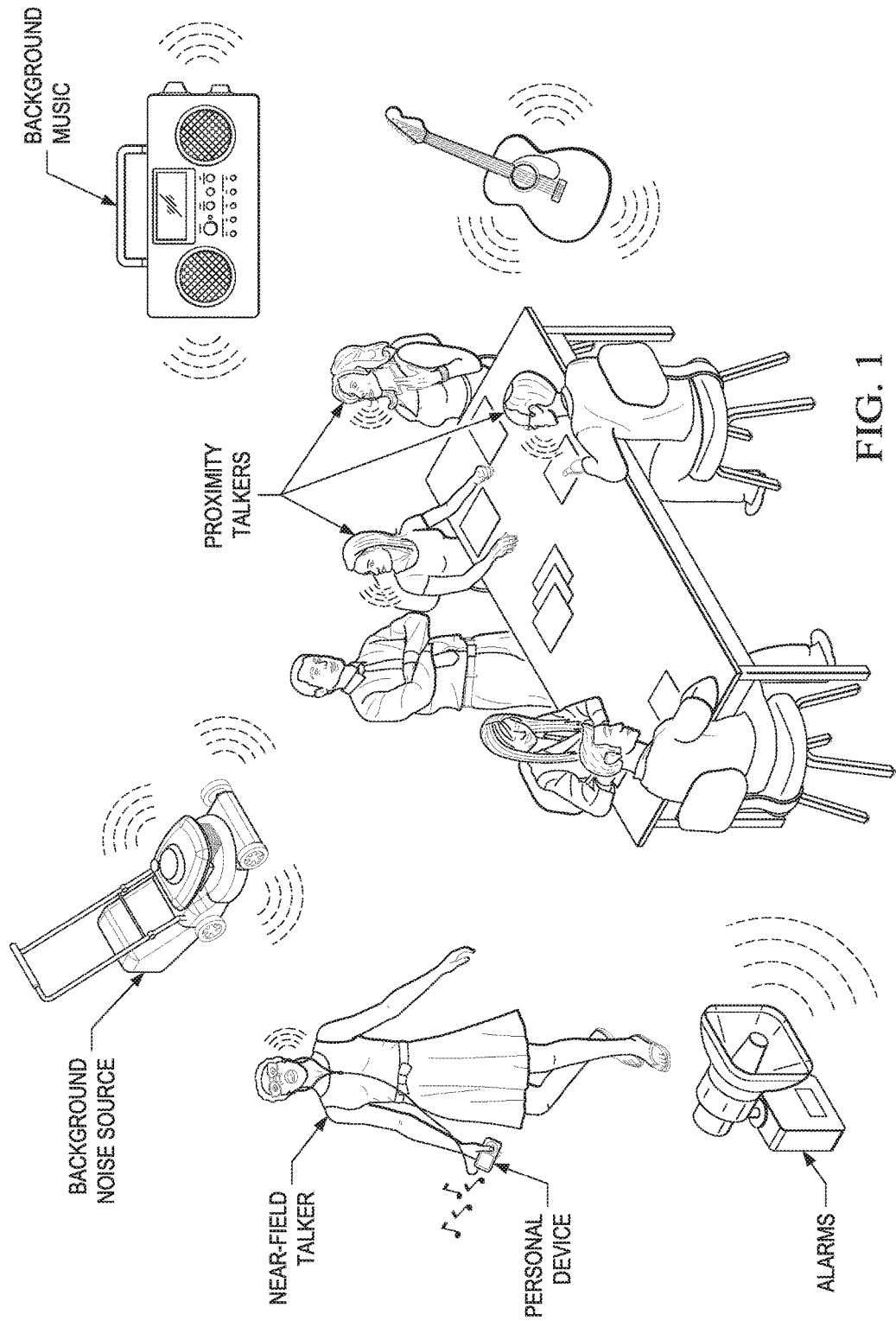
FIG. 1 illustrates an example of a use case scenario wherein various detectors may be used in conjunction with a playback management system to enhance a user experience, in accordance with embodiments of the present disclosure.

In accordance with embodiments of this disclosure, an automatic playback management framework may use one or more audio event detectors. Such audio event detectors for an audio device may include a near-field detector that may detect when sounds in the near-field of the audio device are detected, such as when a user of the audio device (e.g., a user that is wearing or otherwise using the audio device) speaks, a proximity detector that may detect when sounds in proximity to the audio device are detected, such as when another person in proximity to the user of the audio device speaks, and a tonal alarm detector that detects acoustic alarms that may have been originated in the vicinity of the audio device. FIG. 1 illustrates an example of a use case scenario wherein such detectors may be used in conjunction with a playback management system to enhance a user experience, in accordance with embodiments of the present disclosure.

Figure 2:
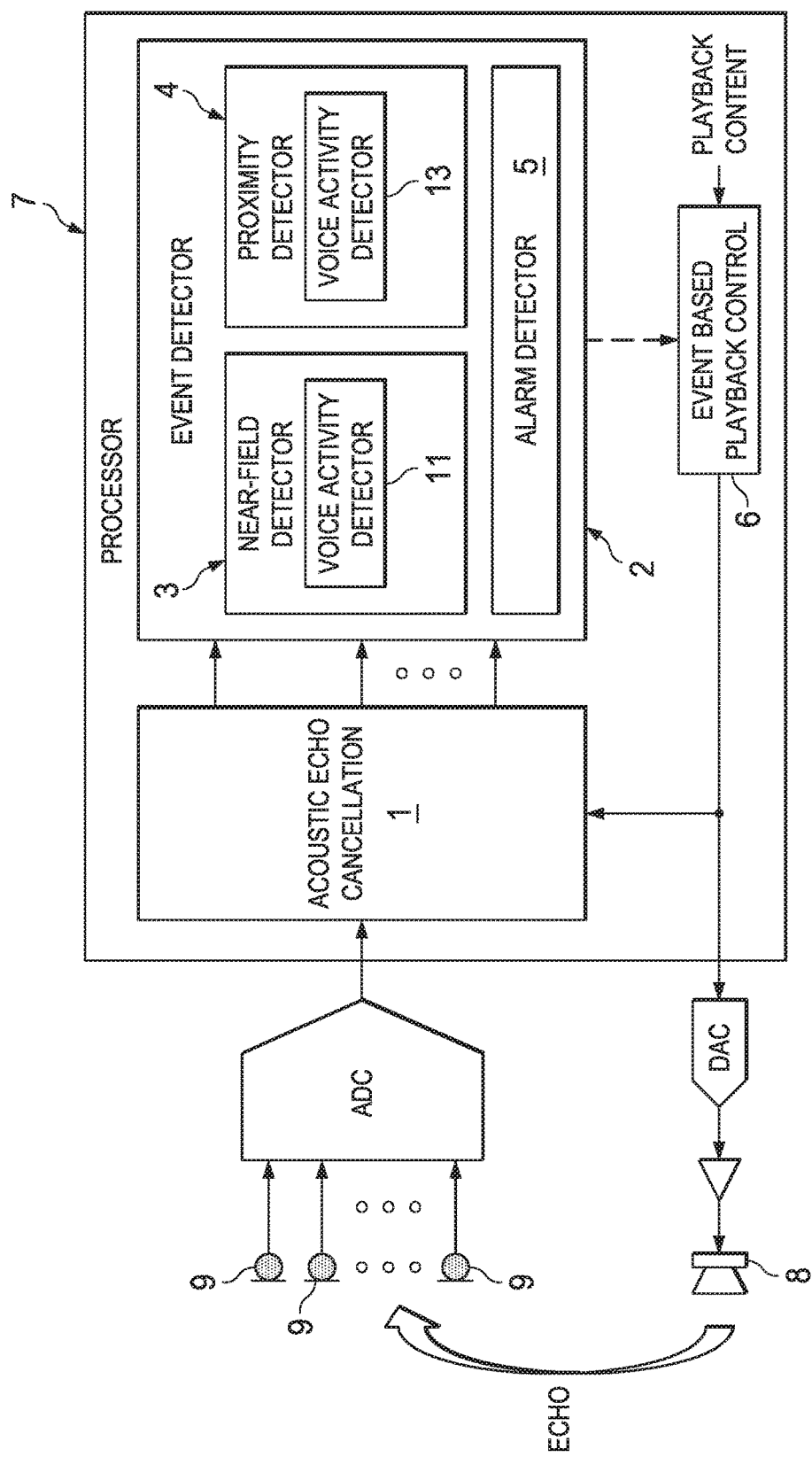
FIG. 2 illustrates an example playback management system, in accordance with embodiments of the present disclosure.

FIG. 2 illustrates an example playback management system that modifies a playback signal based on a decision from an event detector 2, in accordance with embodiments of the present disclosure. Signal processing functionality in a processor 7 may comprise an acoustic echo canceller 1 that may cancel an acoustic echo that is received at microphones 9 due to an echo coupling between an output audio transducer 8 (e.g., loudspeaker) and microphones 9. The echo reduced signal may be communicated to event detector 2 which may detect one or more various ambient events, including without limitation a near-field event (e.g., including but not limited to speech from a user of an audio device) detected by near-field detector 3, a proximity event (e.g., including but not limited to speech or other ambient sound other than near-field sound) detected by proximity detector 4, and/or a tonal alarm event detected by alarm detector 5. If an audio event is detected, an event-based playback control 6 may modify a characteristic of audio information (shown as "playback content" in FIG. 2) reproduced to output audio transducer 8. Audio information may include any information that may be reproduced at output audio transducer 8, including without limitation, downlink speech associated with a telephonic conversation received via a communication network (e.g., a cellular network) and/or internal audio from an internal audio source (e.g., music file, video file, etc.).

As shown in FIG. 2, near-field detector 3 may include a voice activity detector 11 which may be utilized by near-field detector 3 to detect near-field events. Voice activity detector 11 may include any suitable system, device, or apparatus configured to perform speech processing to detect the presence or absence of human speech. In accordance with such processing, voice activity detector 11 may detect the presence of near-field speech.

As shown in FIG. 2, proximity detector 4 may include a voice activity detector 13 which may be utilized by proximity detector 4 to detect events in proximity with an audio device. Similar to voice activity detector 11, voice activity detector 13 may include any suitable system, device, or apparatus configured to perform speech processing to detect the presence or absence of human speech.

Figure 3:
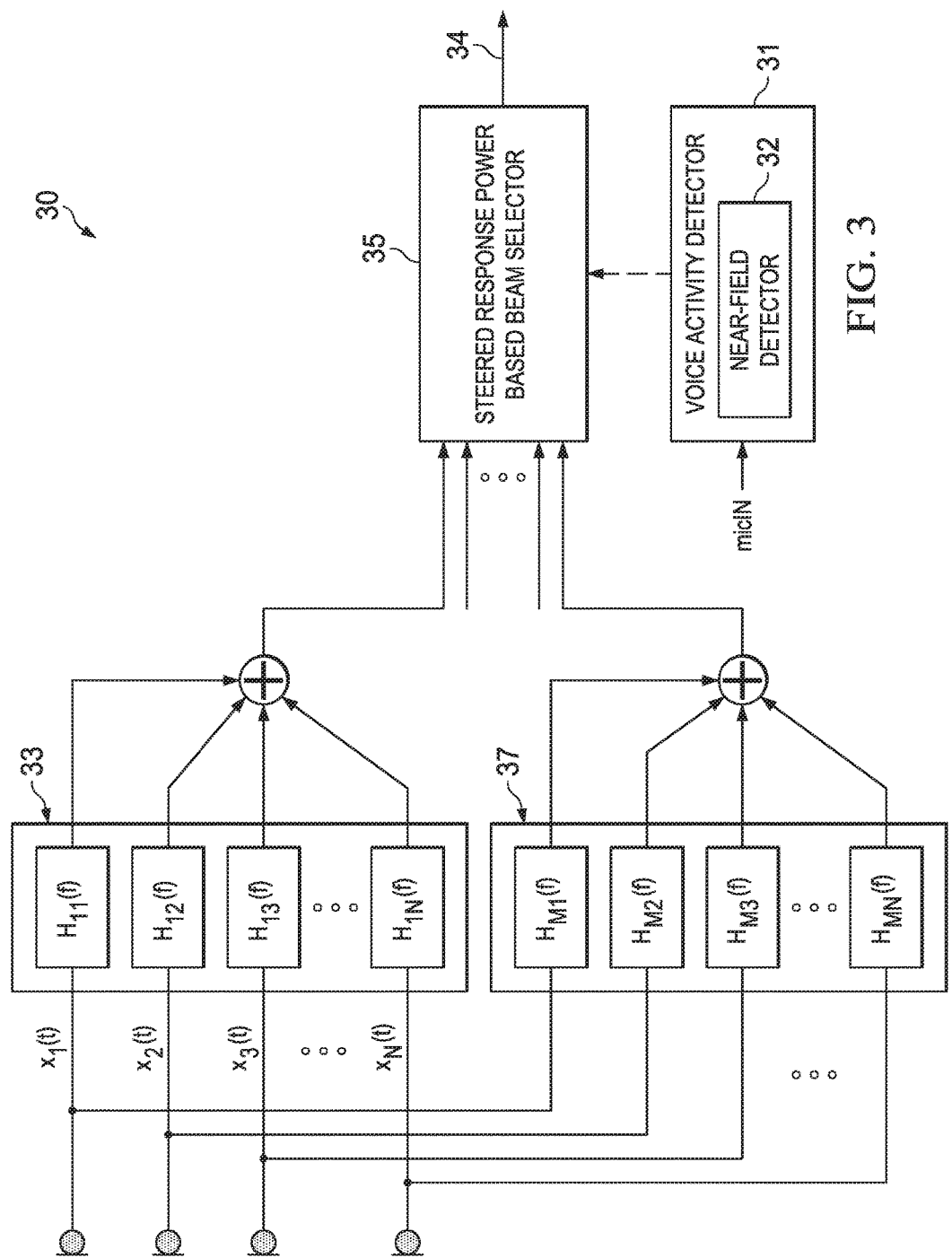
FIG. 3 illustrates an example steered response power based beamsteering system, in accordance with embodiments of the present disclosure.

FIG. 3 illustrates an example steered response power-based beamsteering system 30, in accordance with embodiments of the present disclosure. Steered response power-based beamsteering system 30 may operate by implementing multiple beamformers 33 (e.g., delay-and-sum and/or filter-and-sum beamformers) each with a different look direction such that the entire bank of beamformers 33 will cover the desired field of interest. The beamwidth of each beamformer 33 may depend on a microphone array aperture length. An output power from each beamformer 33 may be computed, and a beamformer 33 having a maximum output power may be switched to an output path 34 by a steered-response power-based beam selector 35. Switching of beam selector 35 may be constrained by a voice activity detector 31 having a near-field detector 32 such that the output power is measured by beam selector 35 only when speech is detected, thus preventing beam selector 35 from rapidly switching between multiple beamformers 33 by responding to spatially non-stationary background impulsive noises.

Figure 4:
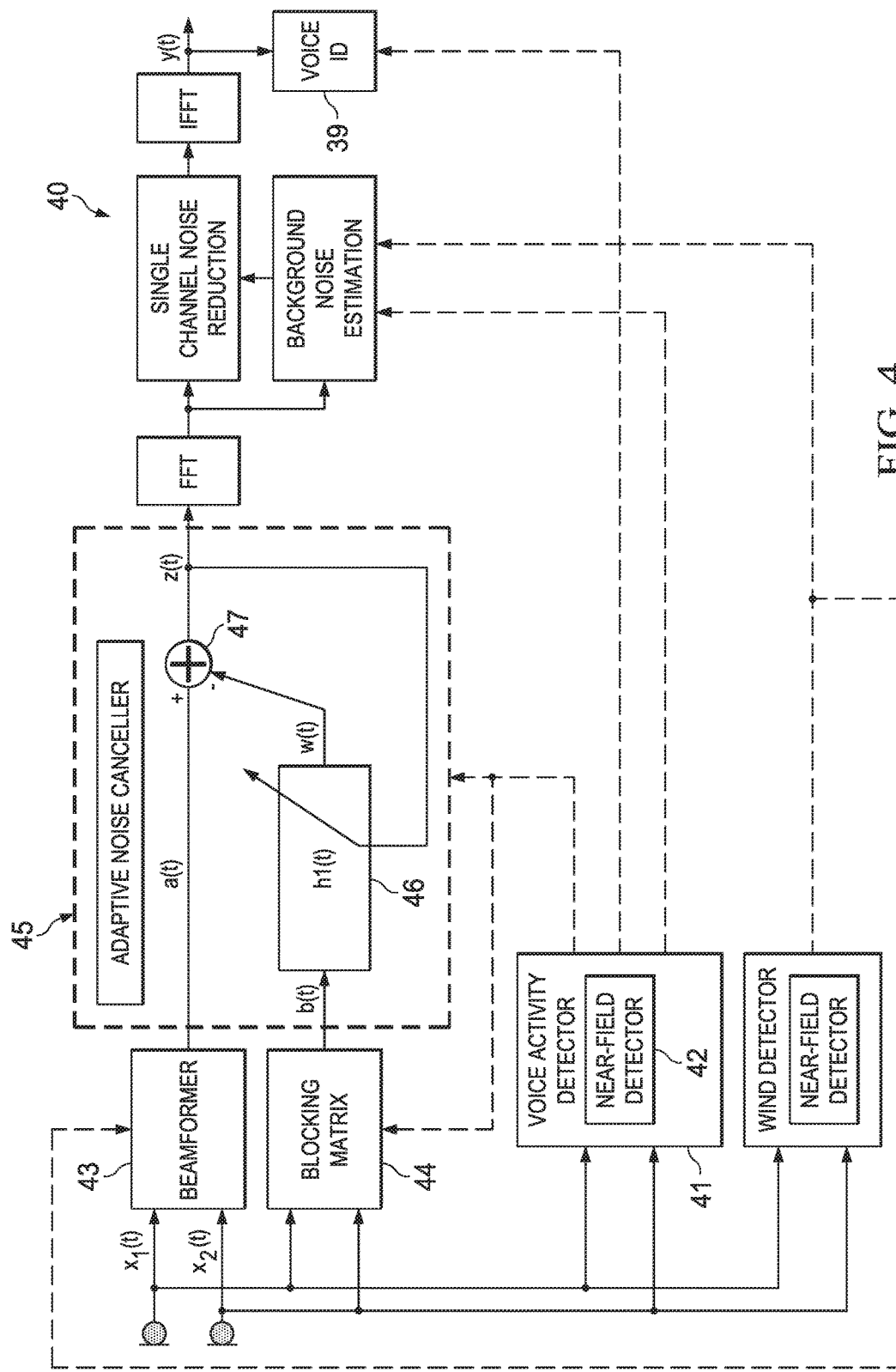
FIG. 4 illustrates an example adaptive beamformer, in accordance with embodiments of the present disclosure.

FIG. 4 illustrates an example adaptive beamformer 40, in accordance with embodiments of the present disclosure. Adaptive beamformer 40 may comprise any system, device, or apparatus capable of adapting to changing noise conditions based on the received data. In general, an adaptive beamformer may achieve higher noise cancellation or interference suppression compared to fixed beamformers. As shown in FIG. 4, adaptive beamformer 40 is implemented as a generalized side lobe canceller (GSC). Accordingly, adaptive beamformer 40 may comprise a fixed beamformer 43, blocking matrix 44, and a multiple-input adaptive noise canceller 45 comprising an adaptive filter 46. If adaptive filter 46 were to adapt at all times, it may train to speech leakage also causing speech distortion during a subtraction stage 47. To increase robustness of adaptive beamformer 40, a voice activity detector 41 having a near-field detector 42 may communicate a control signal to adaptive filter 46 to disable training or adaptation in the presence of speech. In such implementations, voice activity detector 41 may control a noise estimation period wherein background noise is not estimated whenever speech is present. Similarly, the robustness of a GSC to speech leakage may be further improved by using an adaptive blocking matrix, the control for which may include an improved voice activity detector with an impulsive noise detector, as described in U.S. Pat. No. 9,607,603 entitled "Adaptive Block Matrix Using Pre-Whitening for Adaptive Beam Forming." In these and other embodiments, voice activity detector may control initiation of voice authentication processing by a voice identification (ID) authentication block 39 of adaptive beamformer 40.

To further increase robustness of adaptive beamformer 40, a wind detector 49 having a near-field detector 48 may communicate a control signal to a background noise estimator and/or a beamformer 43, to increase performance as described elsewhere in this disclosure.

Figure 5:
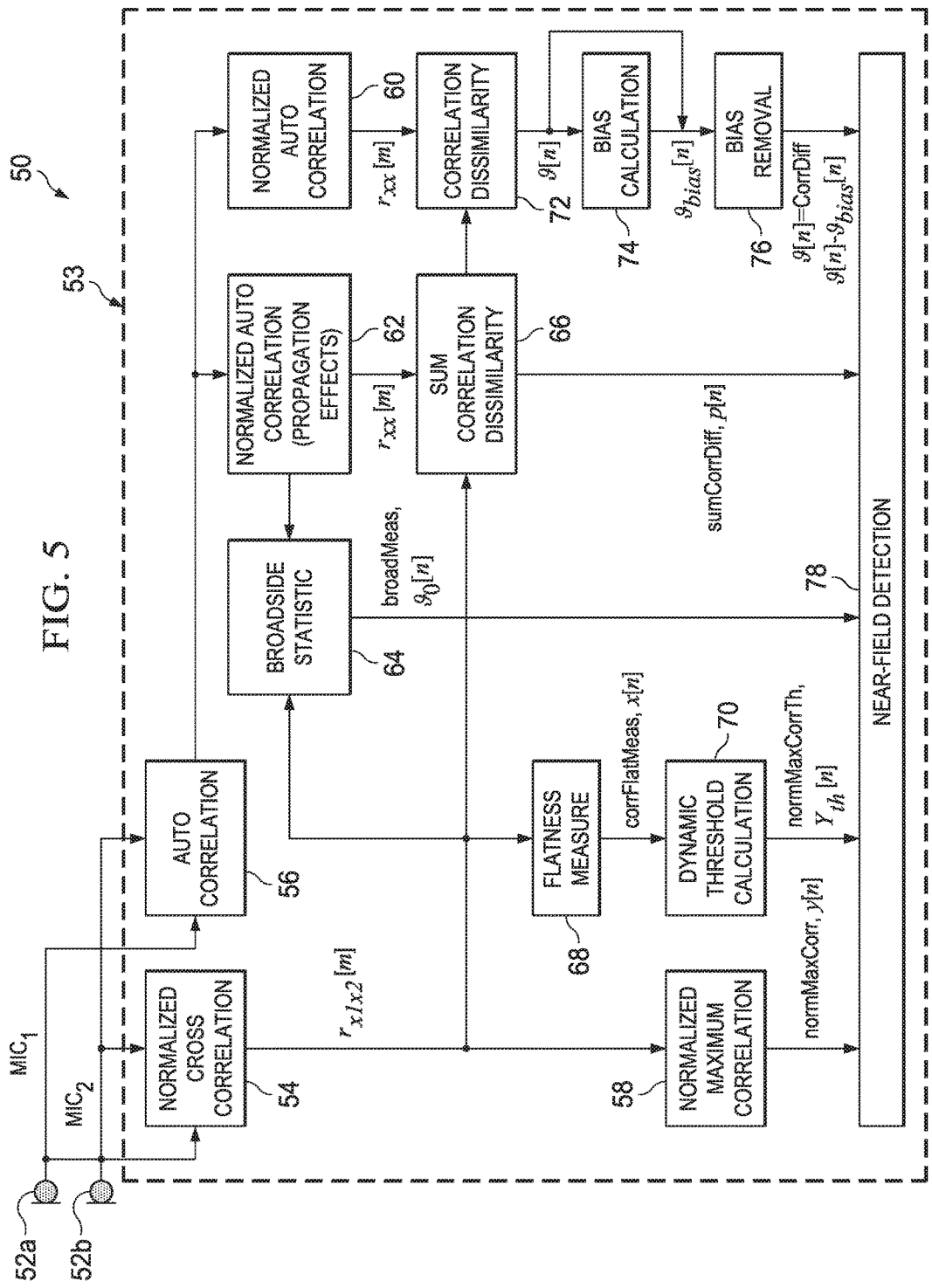
FIG. 5 illustrates a block diagram of selected components of an audio device comprising a near-field detector, in accordance with embodiments of the present disclosure.

FIG. 5 illustrates a block diagram of selected components of an audio device 50 comprising at least two microphones 52a and 52b and a processor 53 for implementing a near-field detector, in accordance with embodiments of the present disclosure. A microphone 52 may comprise any suitable transducer for sensing acoustic pressure and generating an electrical signal indicative of such acoustic pressure. In some embodiments, microphones 52 may be closely spaced (e.g., within 35 millimeters of one another). Each microphone 52 may generate a respective electrical signal (e.g., $mic_1$, $mic_2$) indicative of acoustic pressure upon such microphone. Processor 53 may be communicatively coupled to microphones 52 and may be configured to receive the electrical signals generated by microphones 52 and process such signals to perform near-field detection, as further detailed herein. Although not shown for the purposes of descriptive clarity, a respective analog-to-digital converter may be coupled between each of microphones 52 and processor 53 in order to convert analog signals generated by microphones 52 into corresponding digital signals which may be processed by processor 53.

As shown in FIG. 5, processor 53 may include a normalized cross correlation block 54, an auto correlation block 56, a normalized maximum correlation block 58, a normalized auto correlation block 60, a normalized auto correlation with propagation effects block 62, a broadside statistic block 64, a sum correlation dissimilarity block 66, a flatness measure block 68, a dynamic threshold calculation block 70, a correlation dissimilarity block 72, a bias calculation block 74, a bias removal block 76, and a near-field detection block 78.

When an acoustic source is close to a microphone, a direct-to-reverberant signal ratio at the microphone is usually high. The direct-to-reverberant ratio usually depends on the reverberation time ($RT_{60}$) of the room/enclosure and other physical structures that are in the path between a near-field source and the microphone. When the distance between the source and the microphone increases, the direct-to-reverberant ratio decreases due to propagation loss in the direct path, and the energy of the reverberant signal may be comparable to the direct path signal. Such characteristic may be used to derive a statistic that may indicate the presence of a near-field signal that is robust to a position of an array of microphones (e.g., microphones 52). According to such approach, normalized cross correlation block 54 may compute a cross-correlation sequence between microphones 52a and 52b as:

$$r_{x1x2}[m] = \frac{1}{N}\sum_{n=0}^{N-1} x_1[n]x_2[n-m]$$

where the range of m is:

$$\left[\text{ceil}\left(\frac{d}{c}F_s\right), \text{floor}\left(\frac{d}{c}F_s\right)\right],$$

where d is the microphone spacing, c is the speed of sound, and $F_s$ is a sampling frequency. From the cross-correlation sequence, normalized maximum correlation block 58 may compute a maximum normalized correlation statistic as:

$$\tilde{\gamma} = \max_{\forall m}\left\{\frac{r_{x1x2}[m]}{\sqrt{E_{x1}E_{x2}}}\right\}$$

where $E_{x1}$ corresponds to $i^{th}$ microphone energy. Normalized maximum correlation block 58 may smooth the maximum normalized correlation statistic to generate a smoothed maximum normalized correlation statistic normMaxCorr as:

$$\gamma[n]=\delta_\gamma \gamma[n-1]+(1-\delta_\gamma)\tilde{\gamma}[n]$$

where $\delta_\gamma$ is a smoothing constant.

It may be difficult to set a fixed threshold for the normalized maximum correlation statistic to detect near-field speech in the presence of diverse noise types. Hence, processing blocks of processor 53 may implement an adaptive threshold mechanism that may improve near-field detection rate under various noise conditions. To illustrate, consider the signal model:

$$x_i[n] = s[n]*h_i[n] + \sum_j w_j[n]*g_{ij}[n] + r_i[n]$$

where i=1, 2 and j is the number of noise sources, $h_i[n]$ is an impulse response between the near-field speech source and $i^{th}$ microphone, $g_{ij}[n]$ is an impulse response between $j^{th}$ noise source and $i^{th}$ microphone and $r_i[n]$ is an uncorrelated noise. The cross-correlation sequence for such model may be derived as:

$$r_{x1x2}[m] =$$
$$\sum_k \sum_l h_1[k]h_2[l]r_{ss}[m+l-k] + \sum_j g_{1j}[k]g_{2j}[l]r_{w_j w_j}[m+l-k] + \sigma_r^2 \delta[m]$$

where the first part of the above cross-correlation equation corresponds to speech, the second part corresponds to correlated noise, and $\sigma_r^2$ is the un-correlated noise power. The cross-correlation sequence may be a superposition of speech and noise cross-correlation sequences. The maximum normalized correlation statistic may therefore be biased by the presence of noise in the background. Moreover, the cross-correlation sequence may depend on an auto-correlation of the signal source. Hence, bias introduced by the noise may also vary as a function of the noise spectrum. For example, bias introduced by car noise may be more than bias introduced by wideband noise (e.g., road noise, white noise).

Accordingly, components of processor 53 may implement a dynamic thresholding scheme in which flatness measure block 68 may compute a flatness measure as:

$$\tilde{\mathcal{H}} = \frac{\left\{\prod_{m=-L}^{L} |r_{x1x2}[m]|\right\}^{\frac{1}{2L+1}}}{\frac{1}{2L+1}\sum_{m=-L}^{L} |r_{x1x2}[m]|}.$$

Figure 6:
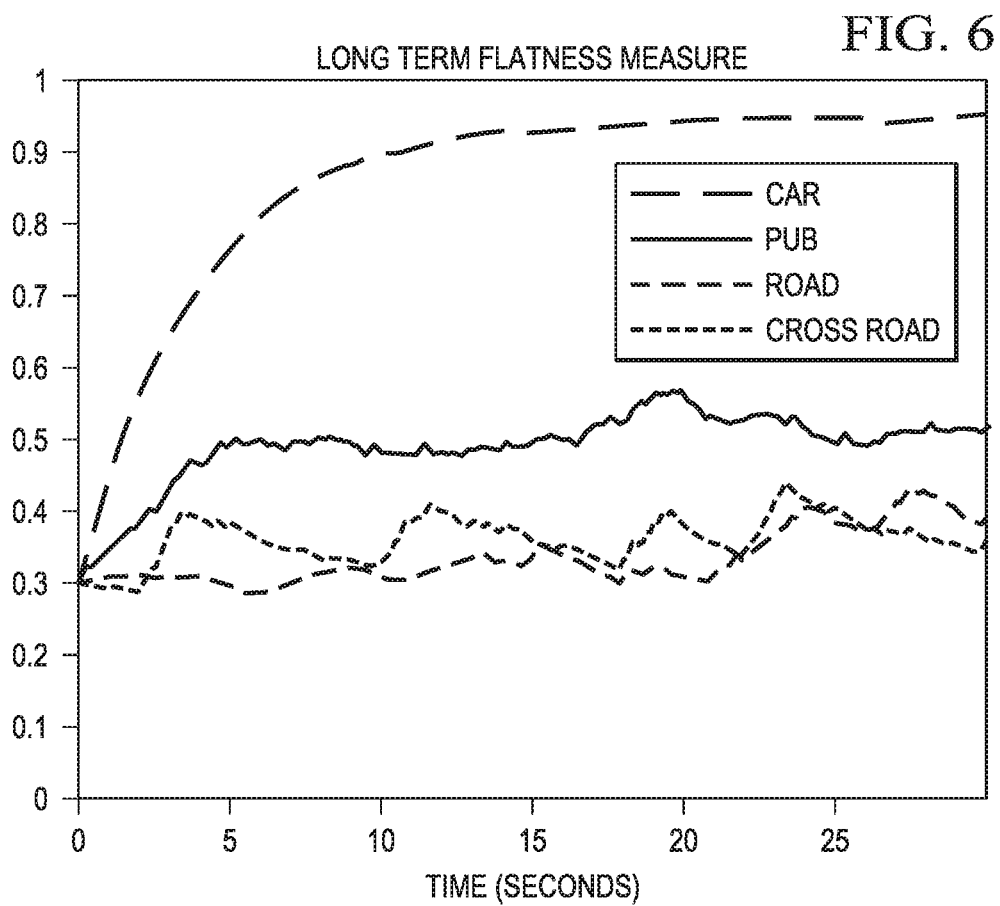
FIG. 6 illustrates a graph depicting example long-term flatness measures for different sources of noise, in accordance with embodiments of the present disclosure.

And from the flatness measure, compute a long-term flatness measure corrFlatMeas as $$x[n] = \delta_x x[n-1] + (1-\delta_x)\tilde{\kappa}[n]$$

where $\delta_\kappa$ is a smoothing constant. Dynamic threshold calculation block 70 may derive a dynamically-adjustable threshold normMaxCorrTh as:

$$\gamma_{th} = \gamma_o + \mu \kappa[n]$$

where $\gamma_o$ is a fixed threshold and the parameter $\mu$ determines a rate at which the threshold may be varied as a function of the flatness measure. The dynamically-adjustable threshold may be adjusted to a higher value if the flatness measure corrFlatMeas is high. For illustrative purposes, FIG. 6 depicts example long-term flatness measures corrFlatMeas for different sources of noise, including a car, a pub, a road, and a crossroad.

Figure 7:
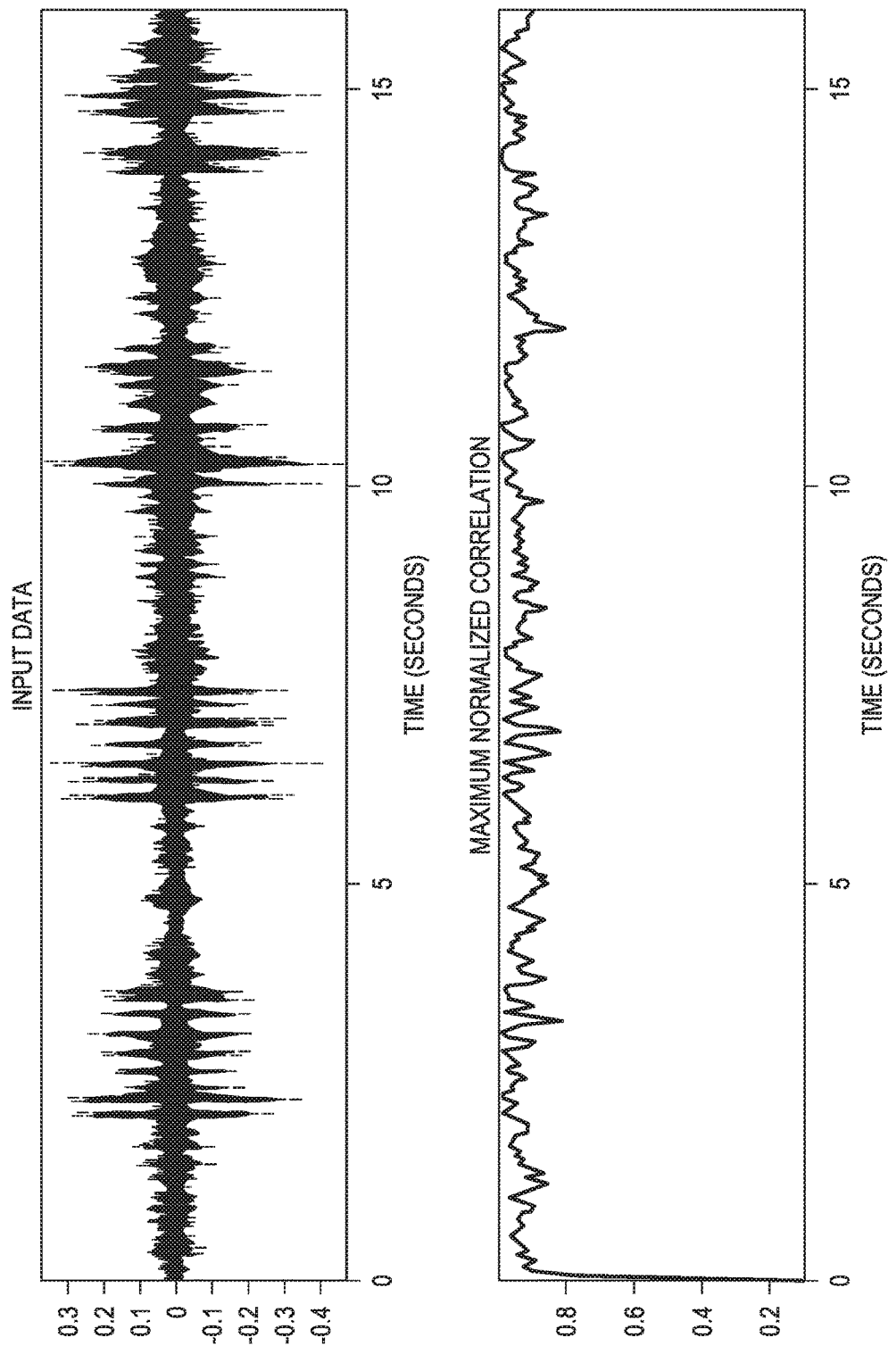
FIG. 7 illustrates graphs depicting example discrimination of a maximum normalized correlation statistic for a microphone array at 25-millimeter spacing, in accordance with embodiments of the present disclosure.

Though the dynamic thresholding scheme described above may optimize a detection rate of near-field speech signals under various noise conditions, the discriminatory ability of the maximum normalized correlation statistic normMaxCorr may degrade when the microphone spacing is small (less than 35 mm). The inter-microphone correlation in such closely-spaced microphone arrays may be high for both near-field speech and noise. The range of m for small microphone spacing d may be at the order of one or two samples at 16 kHz and the cross-correlation function may be flat in such range. To illustrate, spatio-spectral coherence functions for diffused and directional sources may be given by:

$$\Gamma_{diff}(f) = \text{sinc}\left\{\frac{2\pi df}{c}\right\}$$

$$\Gamma_{dir}(f) = e^{\left\{\frac{2\pi df}{c}\right\}}$$

where sin c(x)=sin(x)/x. For a single source stimulus, the cross-correlation function may can be simplified as:

$$r_{x1x2}[m] = r_{ss}[m] * h_p[m]$$

where $r_{ss}[m]$ is the auto-correlation of the source signal and $h_p[m]$ is an inter-microphone impulse response. The spatio-spectral coherence function may become broad as the microphone spacing d reduces and the cross-correlation function, $h_p[m]$ tends to the impulse function. Thus, the cross-correlation function for a closely-spaced microphone array may be governed mostly by an auto-correlation sequence of the source signal. For voice applications, the auto-correlation sequence of sound sources present in the environment is almost flat in a valid lag correlation range, and hence a maximum normalized correlation statistic loses its discriminatory ability. FIG. 7 illustrates that maximum normalized correlation statistic normMaxCorr may be less discriminatory in a microphone array at 25-millimeter spacing.

Figure 8:
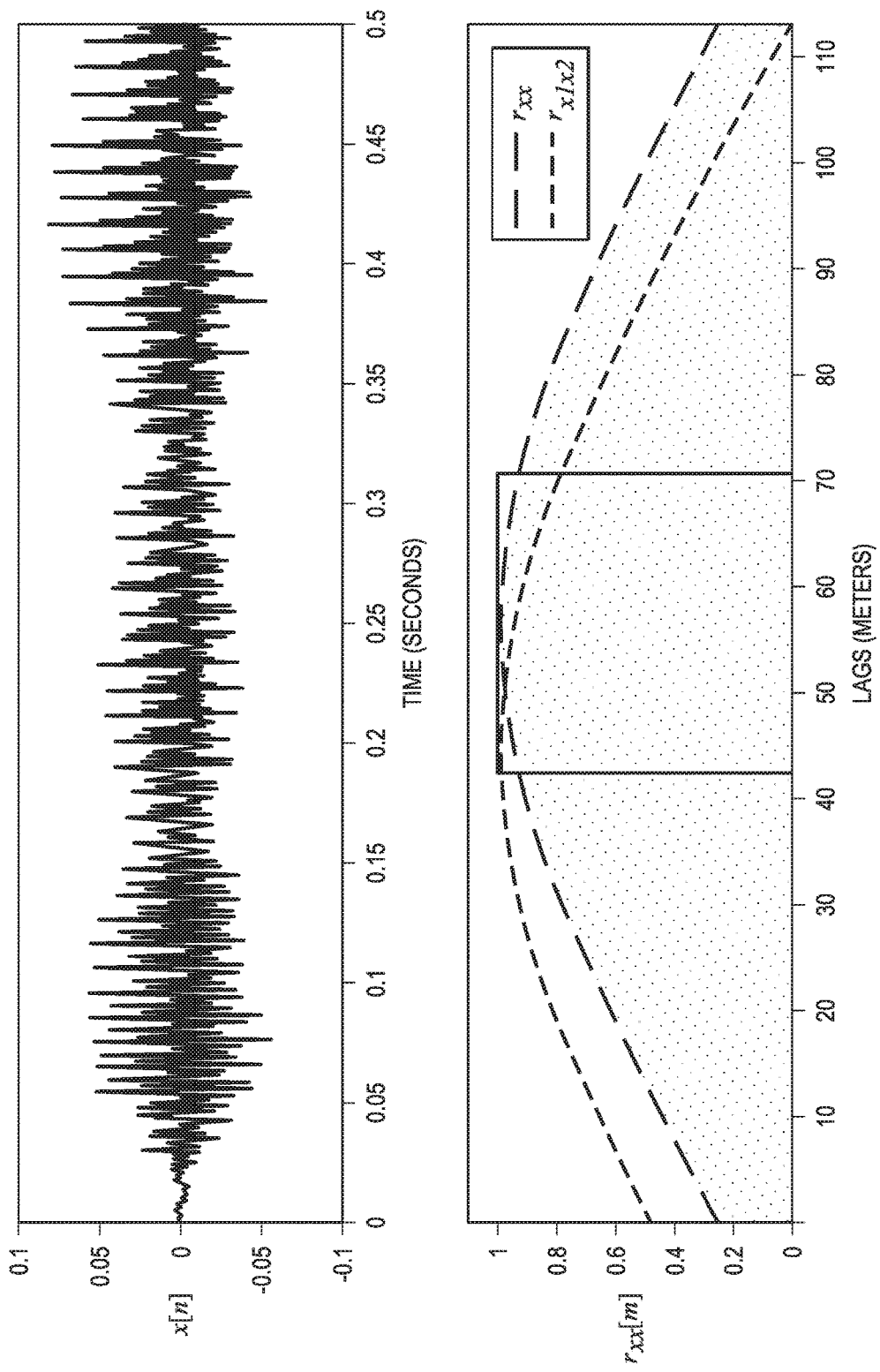
FIG. 8 illustrates a graph depicting an example auto-correlation and cross-correlation sequence for a directional near-field speech source, in accordance with embodiments of the present disclosure.
Figure 9:
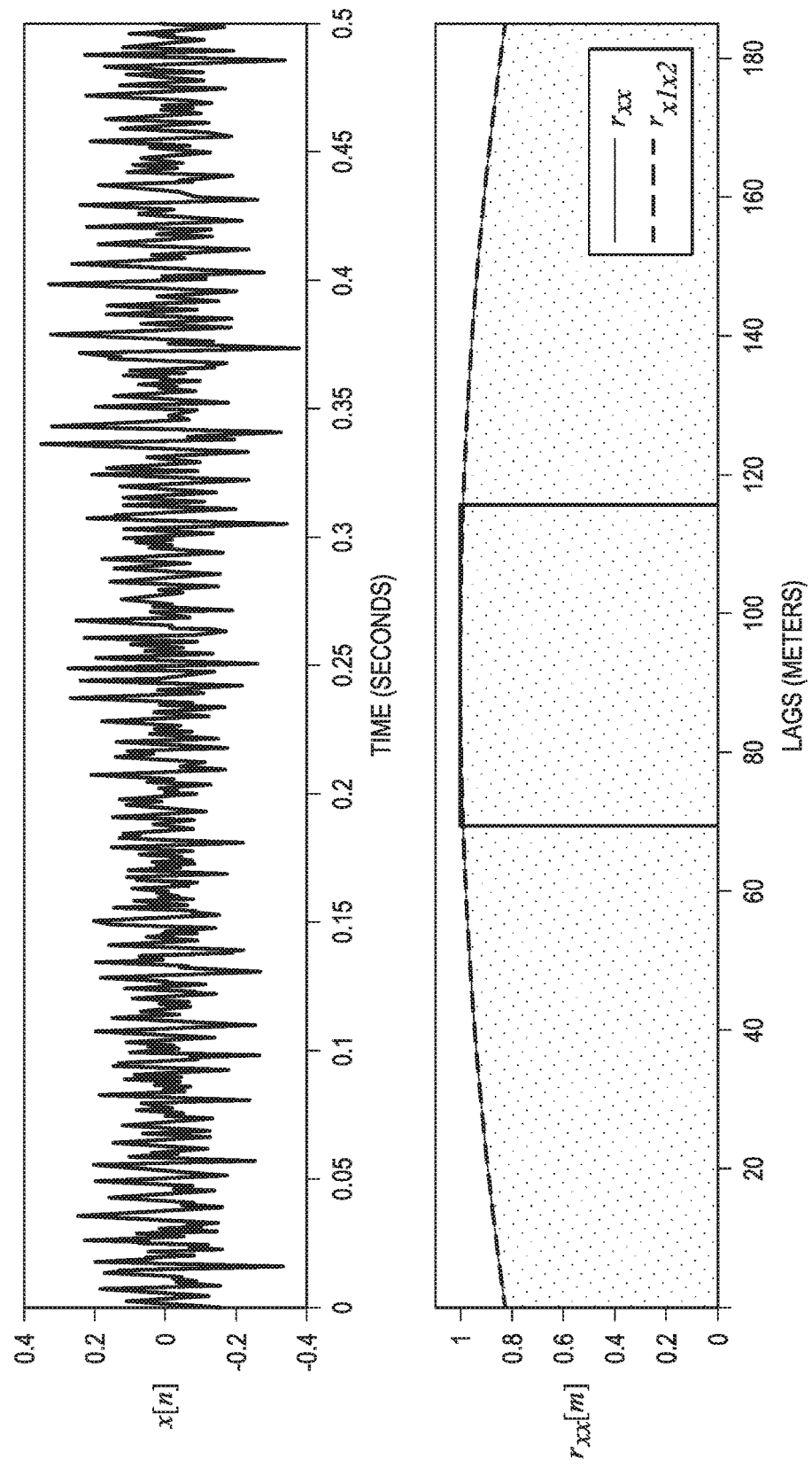
FIG. 9 illustrates a graph depicting an example auto-correlation and cross-correlation sequence for a diffuse noise field, in accordance with embodiments of the present disclosure.

Accordingly, processor 53 may calculate a statistic that is based on an auto-correlation sequence to better discriminate a near-field signal in the presence of background noise. Specifically, processor 53 may be configured to exploit the fact that the shapes of the normalized auto-correlation and cross-correlation sequences for closely-spaced microphones may be similar. FIG. 8 depicts an example auto-correlation and cross-correlation sequence for a directional near-field speech source. As shown in FIG. 8, for directional near-field sources, the cross-correlation sequence may be a shifted version of the auto-correlation sequence. However, for a diffuse noise field, the auto-correlation and cross-correlation sequences may remain similar at all time lags as shown in FIG. 9. Therefore, processor 53 may generate a dissimilarity measure between the auto-correlation and cross-correlation sequences to detect directional near-field sources in the presence of background noise.

To calculate such dissimilarity measure, auto correlation block 56 and normalized auto correlation block 60 together may estimate a normalized auto-correlation sequence as:

$$r_{xx}[m] = \frac{\frac{1}{N}\sum_{n=0}^{N-1} x_1[n]x_1[n-m]}{E_{x1}}$$

Using this result, correlation dissimilarity block 72 may estimate the difference between auto-correlation and cross-correlation sequences separately for positive and negative lags as follows:

For Negative Lags:

$$\partial_-[m] = r_{xx}[m] - r_{x1x2}[m],$$
$$m = -M - L + 1 \ldots \ldots -M,$$
$$M > \text{round}\left\{\frac{d\sin\theta}{c} F_s\right\}$$

-continued

Figure 10:
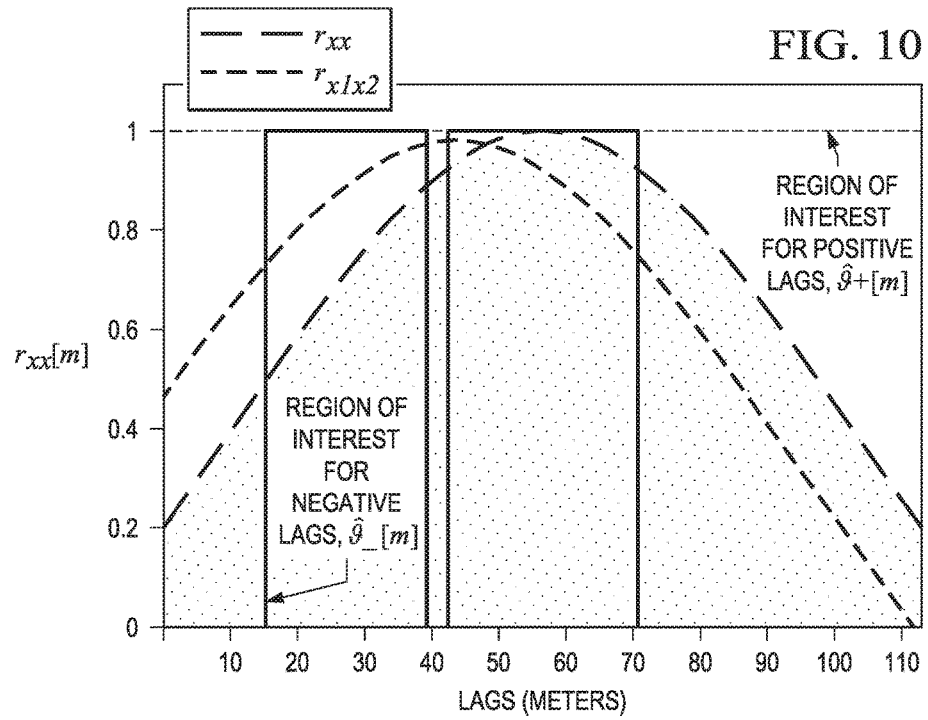
FIG. 10 illustrates a graph depicting an example region of interest used for calculating a correlation dissimilarity measure, in accordance with embodiments of the present disclosure.

For Positive Lags:

$$\hat{\vartheta}_+[m] = r_{xx}[m] - r_{x1x2}[m],$$
$$m = M \ldots \ldots M+L-1$$

where L is the number of lags considered for deriving the statistic. For a signal coming from a negative look direction (e.g., a sound source location is closer to microphone 52a than microphone 52b), $\hat{\vartheta}_-[m]$ is negative and $\hat{\vartheta}_+[m]$ is positive and vice versa. It is important to note that the range of selected lags may be outside the range used for calculating the normalized cross-correlation because the correlation sequences are similar in that lag range. FIG. 10 illustrates an example graph indicating an example region of interest used for calculating the dissimilarity measure. Accordingly, correlation dissimilarity block 72 may further estimate a maximum difference:

$$\vartheta_-[n] = \max_{m=-M-L+1,\ldots,-M} \{\hat{\vartheta}_-[m]\}$$
$$\vartheta_+[n] = \max_{m=M,\ldots,M+L-1} \{\hat{\vartheta}_+[m]\}$$

and therefrom, may derive a correlation dissimilarity statistic as:

$$\hat{\vartheta}[n] = \vartheta_-[n] - \vartheta_+[n]$$

And may further smooth the correlation dissimilarity statistic to generate:

$$\vartheta[n] = \delta_\theta \vartheta[n-1] + (1-\delta_\theta)\hat{\vartheta}[n]$$

A proximity of a user's mouth relative to the array of microphones 52a and 52b may introduce near-field effects in the form of propagation loss difference between the near and far microphones. For most microphone configurations (other than a broadside orientation) with reasonable microphone spacing (e.g., >20 mm), the propagation loss difference may be further exploited for near-field detections. To take advantage of this propagation loss effect, a normalized auto correlation with propagation effects block 62 may compute a normalized auto-correlation separately for positive and negative lags as follows:

$$r_{xx}^-[m] = \frac{\frac{1}{N}\sum_{n=0}^{N-1} x_2[n]x_2[n-m]}{E_{x1}}$$

$$r_{xx}^+[m] = \frac{\frac{1}{N}\sum_{n=0}^{N-1} x_1[n]x_1[n-m]}{E_{x2}}$$

These auto-correlation sequences for negative and positive lags are normalized by microphone 52a and microphone 52b energies, respectively, instead of the same microphone energy as in the previous case.

Sum correlation dissimilarity block 66 may estimate the difference between auto-correlation and cross-correlation sequences in a manner similar to that of correlation dissimilarity block as described above, except the new auto-correlation sequence may be given as:

$$\hat{\vartheta}_-[m] = r_{xx}^-[m] - r_{x1x2}[m]$$

$$\hat{\vartheta}_+[m] = r_{xx}^+[m] - r_{x1x2}[m]$$

Figure 11:
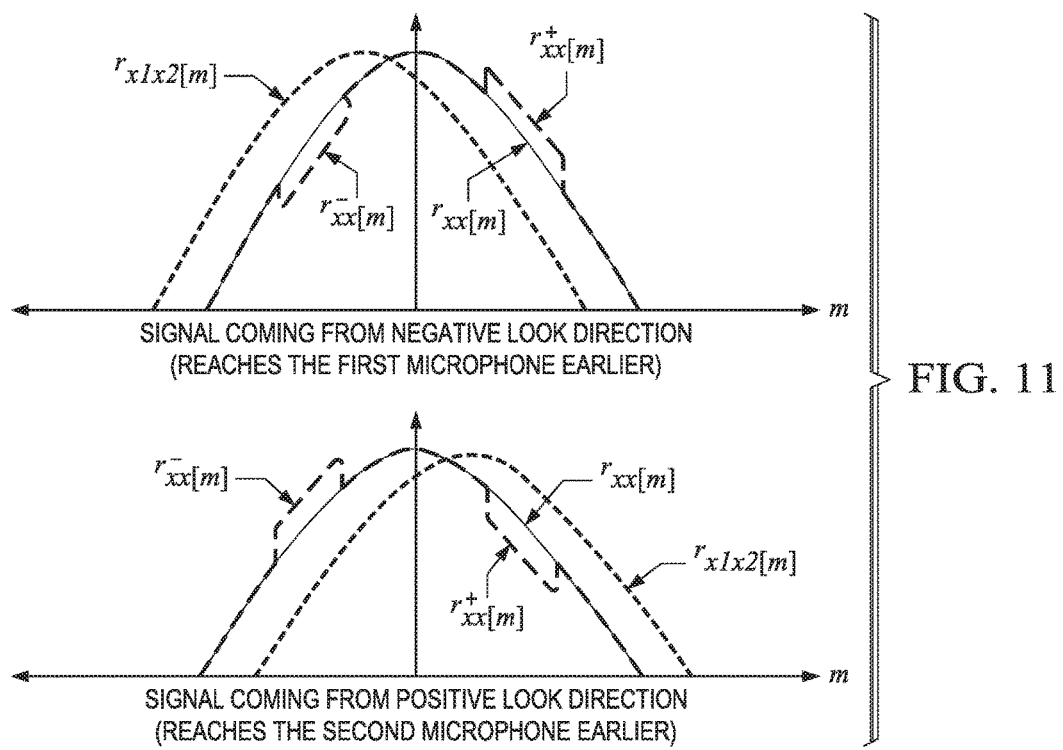
FIG. 11 illustrates a graph depicting example effects of propagation loss in a modified normalized auto-correlation calculated by taking propagation loss effects into account, in accordance with embodiments of the present disclosure.
Figure 12:
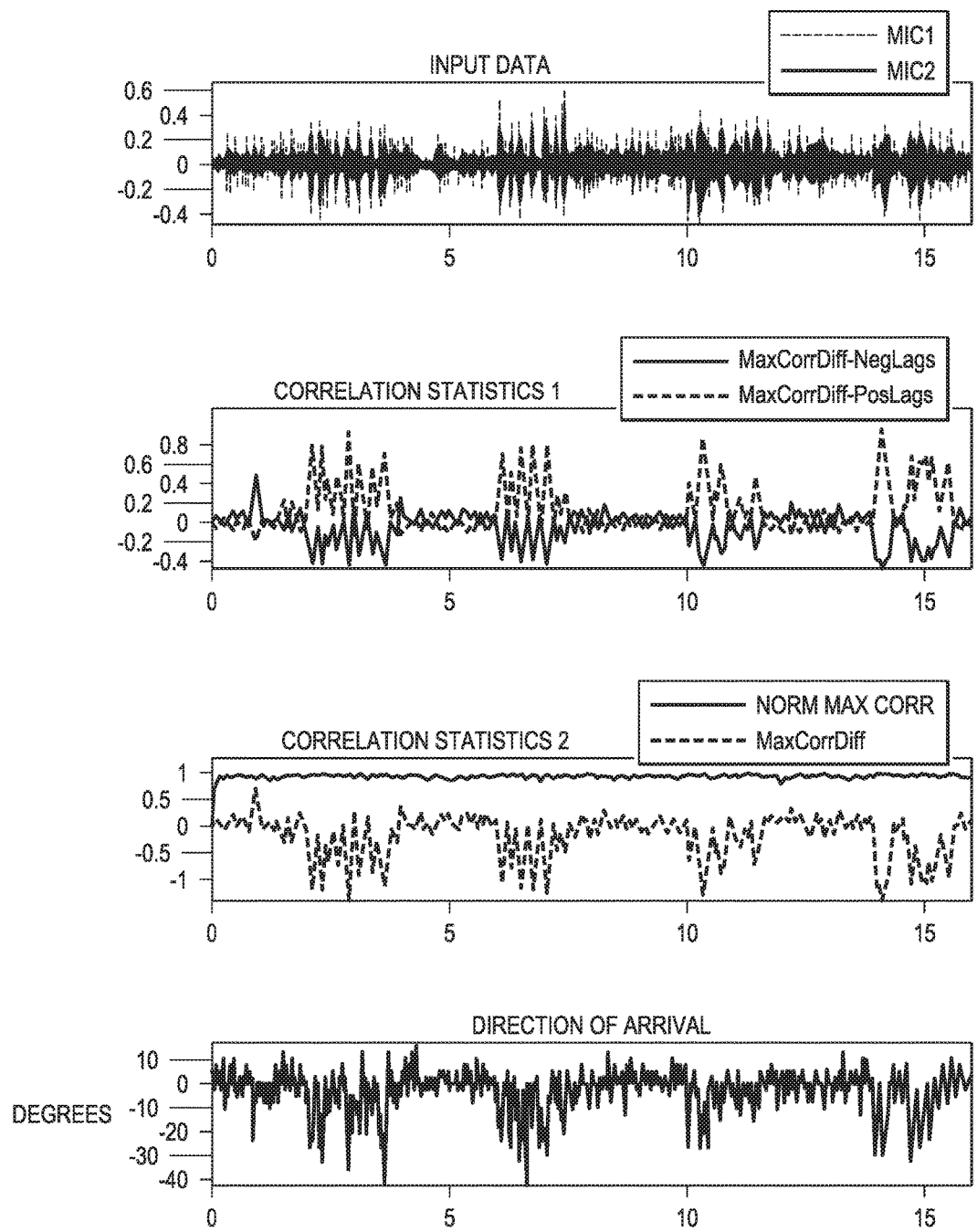
FIG. 12 illustrates graphs depicting an example of a dissimilarity measure statistic with propagation loss for noisy near-field speech corrupted by pub noise, in accordance with embodiments of the present disclosure.

FIG. 11 depicts a graph illustrating example effects of propagation loss in the modified normalized auto-correlation calculated as above, which may increase the discrimination ability of the dissimilarity statistics. FIG. 12 depicts graphs illustrating an example of the dissimilarity measure statistic with propagation loss for noisy near-field speech corrupted by pub noise.

Figure 13:
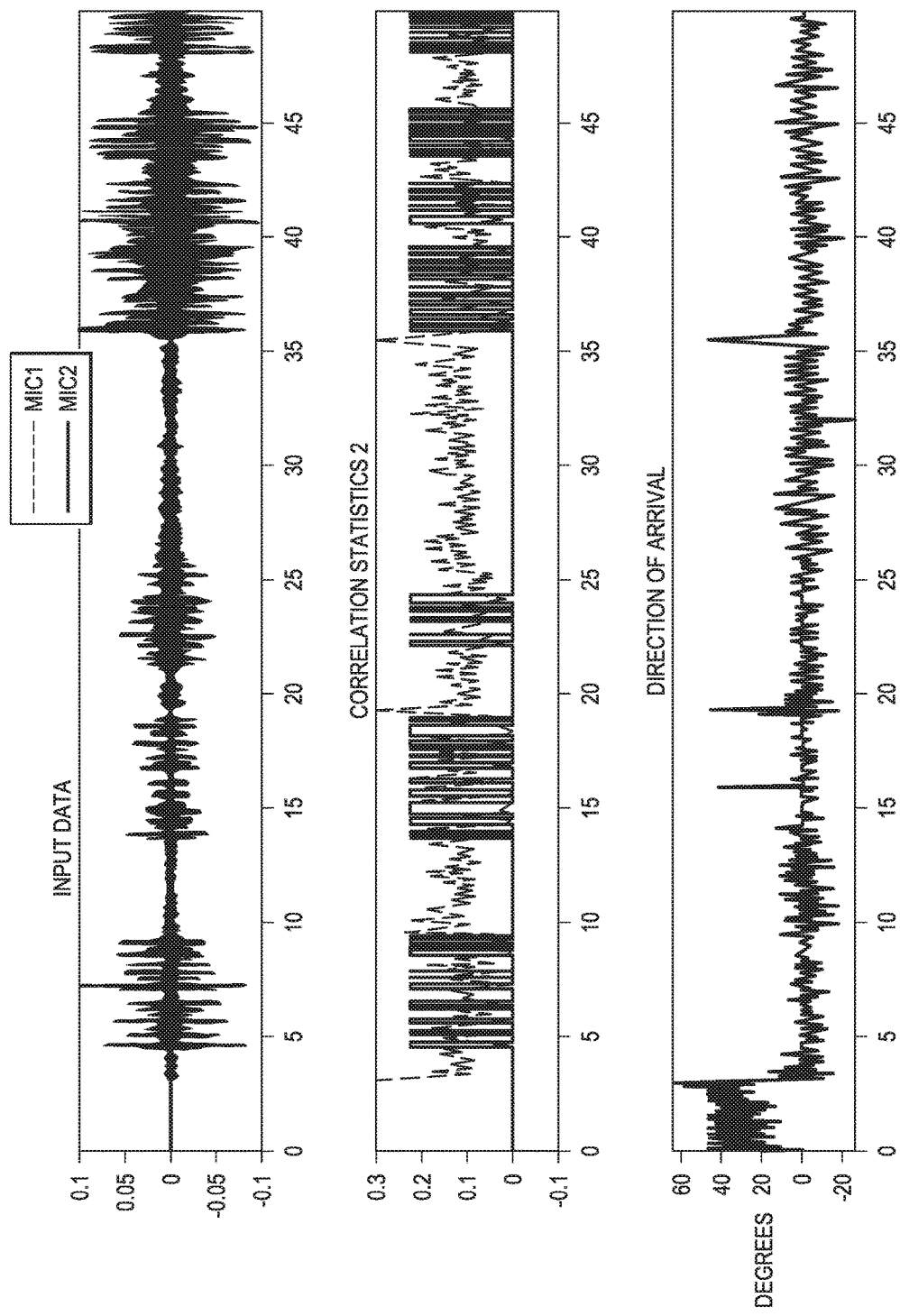
FIG. 13 illustrates graphs depicting an example of the broadside statistic for near-field speech arriving from a broadside direction in the presence of background noise, in accordance with embodiments of the present disclosure.

In many wearable devices, it is not always possible to ensure endfire microphone array orientation (e.g., one microphone lined up between the user's mouth and the other microphone) with respect to a user's mouth. Moreover, in many cases, the array may be oriented broadside to arriving near-field speech. In this orientation, far-field background interfering noise also arrives from the broadside direction. Hence, detecting the near-field speech in such cases is not trivial. The correlation dissimilarity measure that relies on shifted correlation sequence may fail to differentiate broadside near-field speech. However, for near-field broadside speech, the cross-correlation sequence around zero lag may be highly correlated. Therefore, instead of estimating the correlation difference in the regions indicated in FIG. 10, broadside statistic block 64 may estimate the correlation difference around the zero lag. Unlike in previous cases of calculating the dissimilarity measure, the dissimilarity measure in this case should be small to indicate the presence of broadside near-field speech. Broadside statistic block 64 may compute this correlation dissimilarity measure around zero lag or "broadside statistic" as:

$$\hat{\vartheta}_0 = \sum_{m=P-M}^{P+M} r_{xx}[m] - r_{x1x2}[m]$$

where P corresponds to zero delay lag and broadside statistic block 64 may further smooth the broadside statistic broadMeas as:

$$\vartheta_0[n] = \delta_{\theta_0} \vartheta_0[n][n-1] + (1-\delta_{\theta_0})\hat{\vartheta}_0[n]$$

where $\delta_{\theta_0}$ is a smoothing constant. FIG. 13 illustrates graphs depicting an example of the broadside statistic for near-field speech arriving from a broadside direction in the presence of background noise. FIG. 13 also shows a direction of arrival statistic that provides little differentiation between speech and noise. However, the broadside statistic dissimilarity measure indicates the near-field speech in the presence of background noise, as seen in FIG. 13.

The correlation dissimilarity measure $\vartheta[n]$ described above may have a bias when background noise is directional or semi-directional in nature. The bias introduced by this persistent background noise may be estimated using a minimum statistics-based approach such that this bias may be removed from the correlation dissimilarity measure $\vartheta[n]$. Bias calculation block 74 may estimate the bias using the modified Doblinger method, as is known in the art, the bias estimate given by:

if ($|\vartheta_{bias}[n-1]| < |\vartheta[n]|$)
  $\vartheta_{bias}[n] = \vartheta[n]$
else
  $\vartheta_{bias}[n] = \delta_\theta \vartheta_{bias}[n][n-1] + (1-\delta_\theta)\vartheta[n]$ where $\delta_\theta$ is a smoothing parameter that controls a time constant of the averaging filter. Bias removal block 76 may remove the bias from the correlation dissimilarity measure to generate the bias-adjusted correlation dissimilarity measure CorrDiff as:

$$\hat{\vartheta}[n]=\vartheta[n]-\vartheta_{bias}[n]$$

Figure 14:
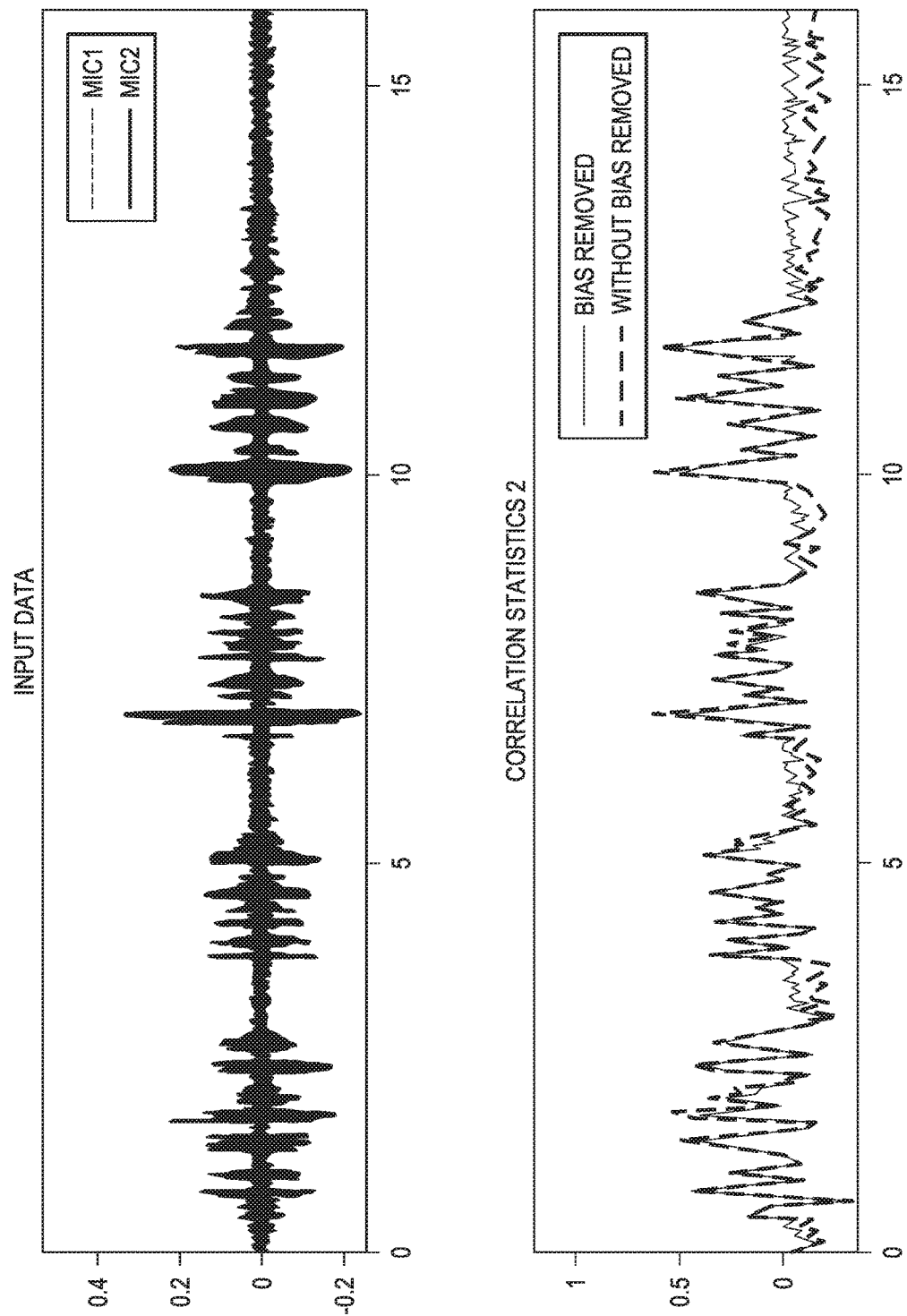
FIG. 14 illustrates graphs depicting example effects of removing bias from a correlation dissimilarity measure when a directional background noise source is present, in accordance with embodiments of the present disclosure.

FIG. 14 illustrates graphs depicting example effects of removing bias from a correlation dissimilarity measure when a directional background noise source is present. The bias removal process may reduce false detections and may also help in setting an appropriate threshold in the detection stage.

Figure 15:
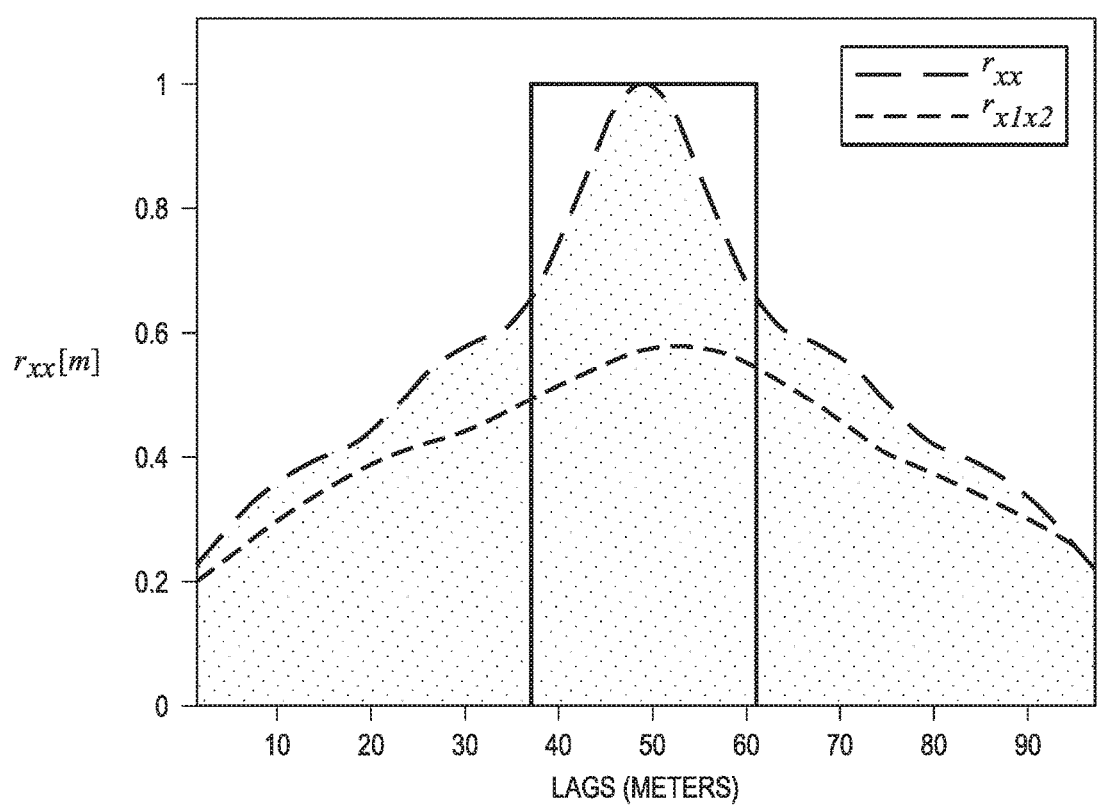
FIG. 15 illustrates graphs depicting an example difference between an auto-correlation and a cross-correlation sequence for spatially-uncorrelated noise, in accordance with embodiments of the present disclosure.

The presence of uncorrelated noise has detrimental effect on the beamformer performance in beamformer applications due to boosting of uncorrelated noise at a beamformer output. Thus, it may be important to detect the presence of uncorrelated noise in the background. The correlation sequences can be used to differentiate uncorrelated noise from correlated ambient noise. As shown in FIG. 15, for uncorrelated noise, the difference between an auto-correlation and a cross-correlation sequence may be large at all lags. Sum correlation dissimilarity block 66 may calculate the sum of correlation difference as:

$$\tilde{\rho} = \sum_m \vartheta_-[m] + \sum_m \vartheta_+[m]$$

and sum correlation dissimilarity block 66 may further smooth this statistic to generate a sum correlation dissimilarity sumCorrDiff as:

$$\rho[n]=\delta_\rho\rho[n-1]+(1-\delta_\rho)\tilde{\rho}[n]$$

where $\delta_\rho$ is a smoothing constant.

Alternatively, sum correlation dissimilarity block 66 may calculate a maximum correlation difference as:

$$\tilde{\rho} = \max_{\forall m}\{\vartheta_-[m], \vartheta_+[m]\}$$

Figure 16:
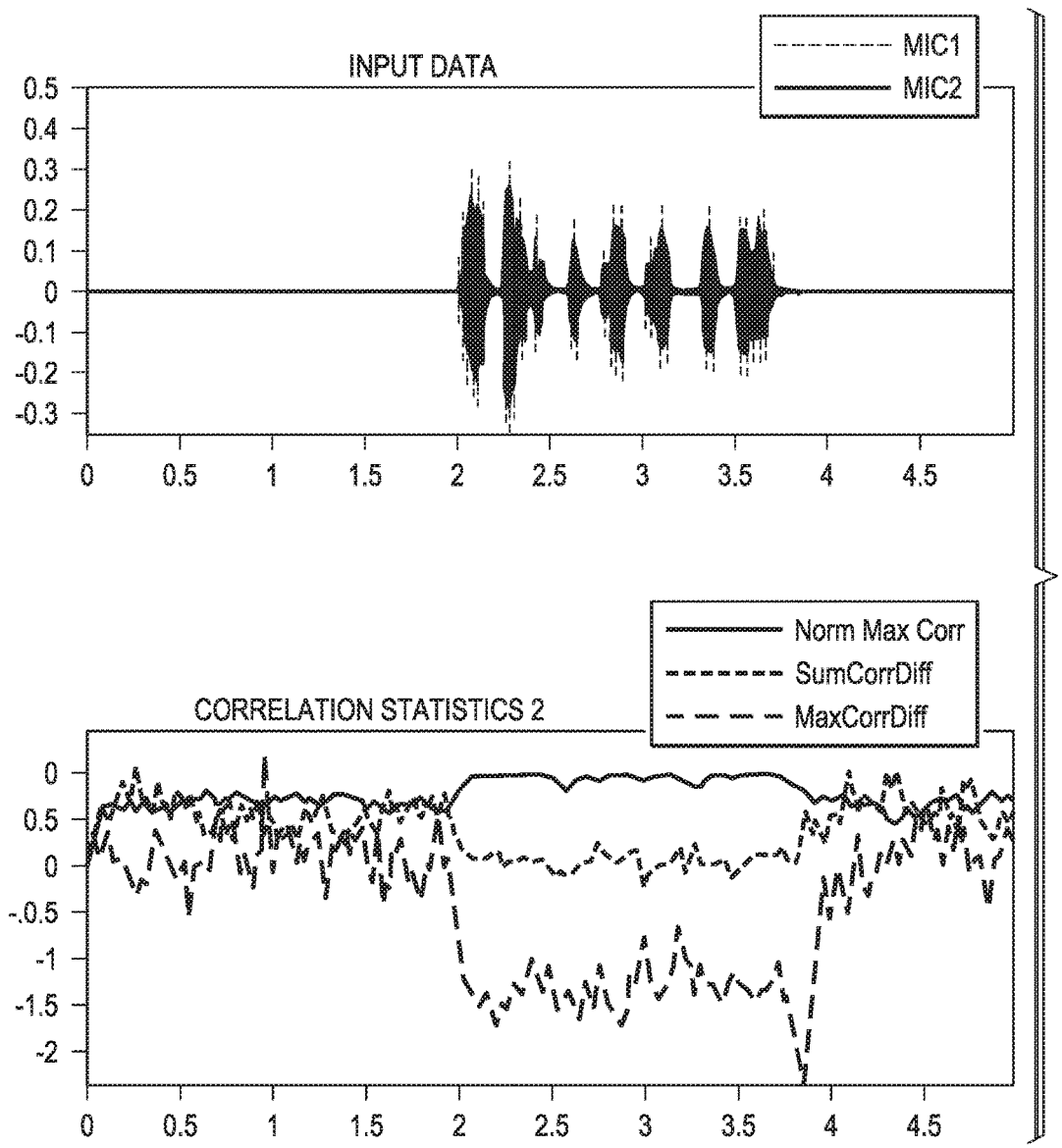
FIG. 16 illustrates graphs depicting example uncorrelated noise statistics extracted from a real recording, in accordance with embodiments of the present disclosure.

FIG. 16 illustrates graphs depicting the uncorrelated noise statistics described above extracted from a real recording. The correlation dissimilarity measures may also be used to detect wind noise that often appears in a typical use case scenario for personal wearable devices. The detected wind noise control signal may be used to control the noise reduction and a beamformer algorithm to either update the wind noise spectral information or to take appropriate action in the front-end beamformer to ensure that the wind noise is not boosted by spatial processing, as shown in FIG. 4.

Based on the maximum normalized correlation statistic normMaxCorr, dynamically-adjustable threshold normMaxCorrTh, sum correlation dissimilarity sumCorrDiff, bias-adjusted correlation dissimilarity measure CorrDiff, and broadside statistic broadMeas, near-field detection block 78 may detect whether near-field speech is present.

Figure 17:
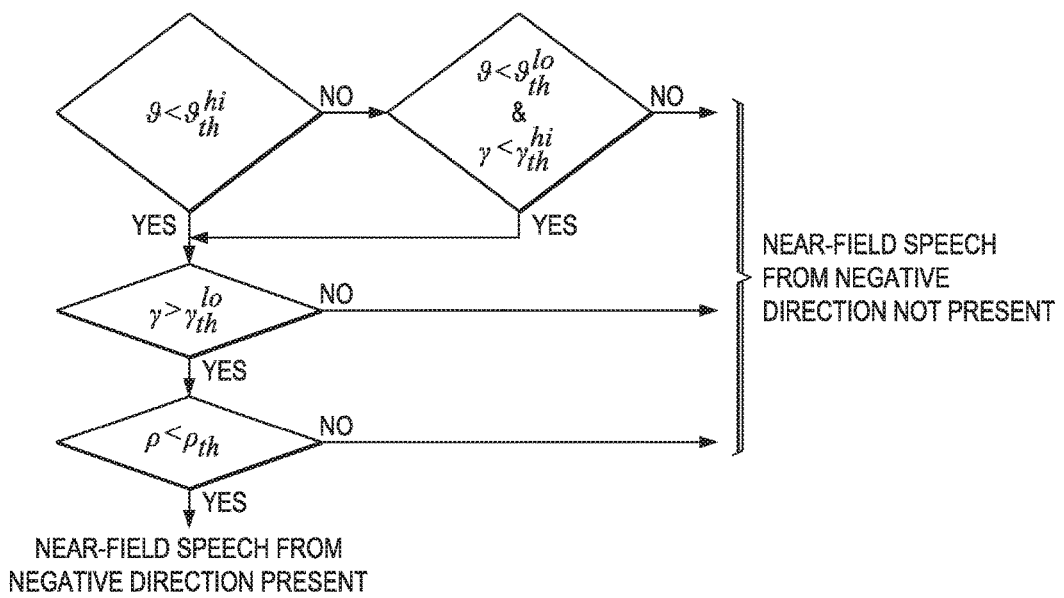
FIG. 17 illustrates a flow chart depicting comparisons a near-field detection block may make to detect if near-field speech is present from a negative direction, in accordance with embodiments of the present disclosure.

FIG. 17 illustrates a flow chart depicting comparisons near-field detection block 78 may make to detect if near-field speech is present from a negative direction (e.g., near-field source is closer to microphone 52a than microphone 52b). Near-field detection block 78 may determine that near-field speech is present from the negative direction if: (a) normalized correlation statistic normMaxCorr γ[n] is greater than a first dynamically-adjustable threshold normMaxCorrTh $\gamma_{th}$; (b) sum correlation dissimilarity sumCorrDiff ρ[n] is less than a relevant threshold; and (c) either (i) bias-adjusted correlation dissimilarity measure CorrDiff is lesser than a first correlation dissimilarity measure threshold, OR (ii) bias-adjusted correlation dissimilarity measure CorrDiff is lesser than a second correlation dissimilarity measure threshold and normalized correlation statistic normMaxCorr γ[n] is greater than a second dynamically-adjustable threshold normMaxCorrTh $\gamma_{th}$.

Figure 18:
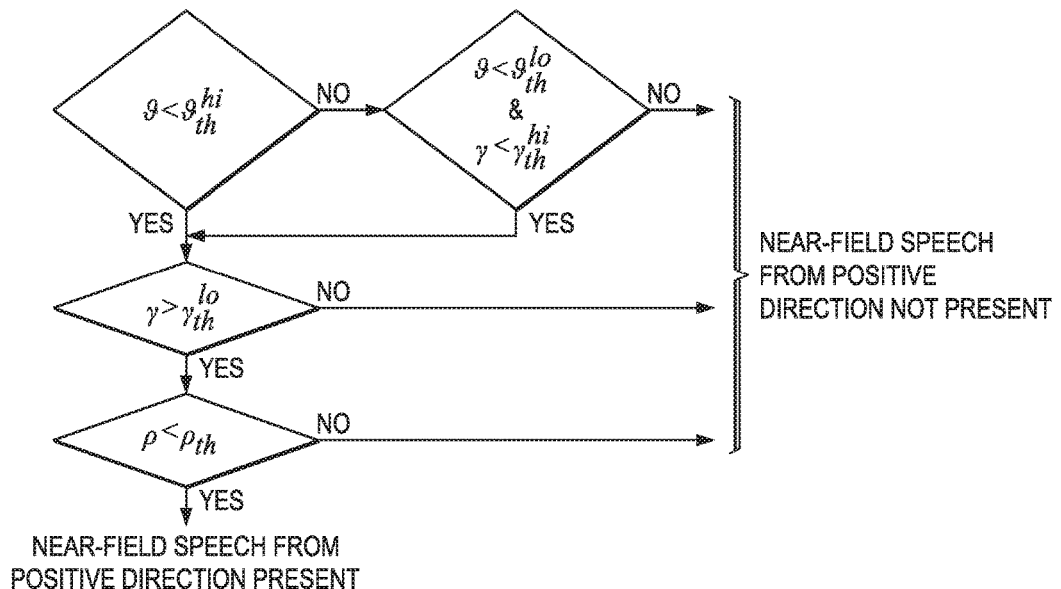
FIG. 18 illustrates a flow chart depicting comparisons a near-field detection block may make to detect if near-field speech is present from a positive direction, in accordance with embodiments of the present disclosure.

FIG. 18 illustrates a flow chart depicting comparisons near-field detection block 78 may make to detect if near-field speech is present from a positive direction (e.g., near-field source is closer to microphone 52b than microphone 52a). Near-field detection block 78 may determine that near-field speech is present from the negative direction if: (a) normalized correlation statistic normMaxCorr γ[n] is greater than a first dynamically-adjustable threshold normMaxCorrTh $\gamma_{th}$; (b) sum correlation dissimilarity sumCorrDiff ρ[n] is less than a relevant threshold; and (c) either (i) bias-adjusted correlation dissimilarity measure CorrDiff is greater than a first correlation dissimilarity measure threshold, OR (ii) bias-adjusted correlation dissimilarity measure CorrDiff is greater than a second correlation dissimilarity measure threshold and normalized correlation statistic normMaxCorr γ[n] is greater than a second dynamically-adjustable threshold normMaxCorrTh $\gamma_{th}$.

Figure 19:
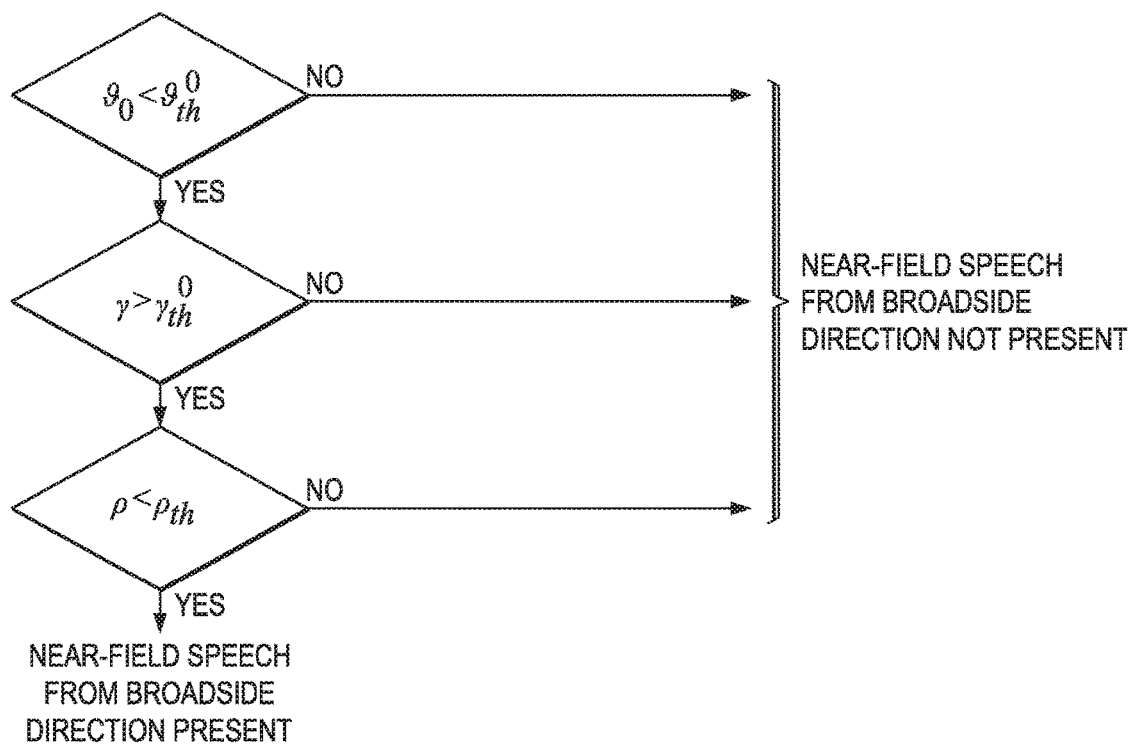
FIG. 19 illustrates a flow chart depicting comparisons a near-field detection block may make to detect if near-field speech is present from a broadside direction, in accordance with embodiments of the present disclosure.

FIG. 19 illustrates a flow chart depicting comparisons near-field detection block 78 may make to detect if near-field speech is present from a broadside direction. Near-field detection block 78 may determine that near-field speech is present from the negative direction if: (a) normalized correlation statistic normMaxCorr γ[n] is greater than a relevant dynamically-adjustable threshold normMaxCorrTh $\gamma_{th}$; (b) sum correlation dissimilarity sumCorrDiff ρ[n] is less than a relevant threshold; and (c) bias-adjusted correlation dissimilarity measure CorrDiff is lesser than a relevant threshold.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

What is claimed is:

1. A method for detecting near-field sources in an audio device, comprising:
   computing a normalized cross correlation function between a first microphone signal and a second microphone signal;

computing normalized auto correlation functions of each of the first microphone signal and the second microphone signal;

partitioning the normalized cross correlation function and the normalized auto correlation functions into a plurality of time lag regions;

computing for each respective time lag region of the plurality of time lag regions a respective maximum deviation between the normalized cross correlation function and a normalized auto correlation function within the respective time lag region;

combining the respective maximum deviations from the plurality of time lag regions to derive multiple detection statistics; and comparing each detection statistic of the multiple detection statistics to a respective threshold to detect a near-field signal.

2. The method of claim 1, wherein the multiple detection statistics comprise one or more of a normalized maximum correlation statistic, a correlation dissimilarity statistic, a broadside statistic, and an uncorrelated noise statistic.

3. The method of claim 1, wherein the multiple detection statistics comprise a bias-corrected correlation dissimilarity statistic comprising a correlation dissimilarity statistic with a bias removed to compensate for bias present when background noise within the input signal is directional or semi-directional.

4. The method of claim 1, further comprising:
computing a maximum of the normalized cross correlation function; and
comparing the maximum of the normalized cross correlation function with a threshold to detect a near-field signal.

5. The method of claim 4, further comprising:
computing a long-term flatness measure statistic of the maximum of the normalized cross correlation function; and
dynamically modifying the threshold based on the long-term flatness measure statistic.

6. The method of claim 1, wherein the multiple detection statistics comprise an uncorrelated noise statistic, and the method further comprises:
computing a maximum of the normalized cross correlation function; and
comparing the maximum of the normalized cross correlation function with a first threshold and comparing the uncorrelated noise statistic to a second threshold to detect presence of wind noise.

7. The method of claim 1, further comprising modifying a characteristic associated with audio information in response to detection of a near-field signal.

8. The method of claim 7, wherein the characteristic comprises one or more of:
an amplitude of one or both of the first microphone signal and the second microphone signal; and
spectral content of one or both of the first microphone signal and the second microphone signal.

9. The method of claim 7, wherein the characteristic comprises at least one coefficient of a voice-based processing algorithm including at least one of a noise suppressor, a background noise estimator, an adaptive beamformer, dynamic beam steering, always-on voice, and a conversation-based playback management system.

10. The method of claim 1, wherein the first microphone and the second microphone are disposed in a personal audio device and arranged in proximity to one another at a distance of less than approximately 35 millimeters.

11. The method of claim 1, further comprising initiating voice authentication processing based on detecting of the near-field signal.

12. An integrated circuit for implementing at least a portion of an audio device, comprising:
an audio output configured to reproduce audio information by generating an audio output signal for communication to at least one transducer of the audio device;
a first microphone input configured to receive a first microphone signal;
a second microphone input configured to receive a second microphone signal; and
a processor configured to implement a near-field detector configured to:
compute a normalized cross correlation function between the first microphone signal and the second microphone signal;
compute normalized auto correlation functions of each of the first microphone signal and the second microphone signal;
partition the normalized cross correlation function and the normalized auto correlation functions into a plurality of time lag regions;
compute for each respective time lag region of the plurality of time lag regions a respective maximum deviation between the normalized cross correlation function and a normalized auto correlation function within the respective time lag region;
combine the respective maximum deviations from the plurality of time lag regions to derive multiple detection statistics; and
compare each detection statistic of the multiple detection statistics to a respective threshold to detect a near-field signal.

13. The integrated circuit of claim 12, wherein the multiple detection statistics comprise one or more of a normalized maximum correlation statistic, a correlation dissimilarity statistic, a broadside statistic, and an uncorrelated noise statistic.

14. The integrated circuit of claim 12, wherein the multiple detection statistics comprise a bias-corrected correlation dissimilarity statistic comprising a correlation dissimilarity statistic with a bias removed to compensate for bias present when background noise within the input signal is directional or semi-directional.

15. The integrated circuit of claim 12, wherein the processor is further configured to:
compute a maximum of the normalized cross correlation function; and
compare the maximum of the normalized cross correlation function with a threshold to detect a near-field signal.

16. The integrated circuit of claim 15, wherein the processor is further configured to:
compute a long-term flatness measure statistic of the maximum of the normalized cross correlation function; and
dynamically modify the threshold based on the long-term flatness measure statistic.

17. The integrated circuit of claim 12, wherein the multiple detection statistics comprise an uncorrelated noise statistic, and the processor is further configured to:
compute a maximum of the normalized cross correlation function; and
compare the maximum of the normalized cross correlation function with a first threshold and compare the uncorrelated noise statistic to a second threshold to detect presence of wind noise.

18. The integrated circuit of claim 12, wherein the processor is further configured to modify a characteristic associated with the audio information in response to detection of a noise event.

19. The integrated circuit of claim 18, wherein the characteristic comprises:
   an amplitude of one or both of the first microphone signal and the second microphone signal; and
   spectral content of one or both of the first microphone signal and the second microphone signal.

20. The integrated circuit of claim 18, wherein the characteristic comprises at least one coefficient of a voice-based processing algorithm including at least one of a noise suppressor, a background noise estimator, an adaptive beamformer, dynamic beam steering, always-on voice, and a conversation-based playback management system.

21. The integrated circuit of claim 12, wherein the first microphone and the second microphone are disposed in a personal audio device and arranged in proximity to one another at a distance of less than approximately 35 millimeters.

22. The integrated circuit of claim 12, wherein the processor is further configured to initiate voice authentication processing based on detecting of the near-field signal.

* * * * *